United States Patent
Suzuki

(10) Patent No.: US 9,312,718 B2
(45) Date of Patent: Apr. 12, 2016

(54) DISCHARGE CONTROLLER

(75) Inventor: Shin Suzuki, Kanagawa (JP)

(73) Assignee: NEC ENERGY DEVICES, LTD., Kanagawa (JP)

( * ) Notice: Subject to any disclaimer, the term of this patent is extended or adjusted under 35 U.S.C. 154(b) by 301 days.

(21) Appl. No.: 13/989,871

(22) PCT Filed: Oct. 27, 2011

(86) PCT No.: PCT/JP2011/074757
§ 371 (c)(1),
(2), (4) Date: May 28, 2013

(87) PCT Pub. No.: WO2012/086309
PCT Pub. Date: Jun. 28, 2012

(65) Prior Publication Data
US 2013/0249497 A1    Sep. 26, 2013

(30) Foreign Application Priority Data
Dec. 24, 2010  (JP) ................................. 2010-287811

(51) Int. Cl.
H02J 7/00 (2006.01)
G01N 27/02 (2006.01)
H01M 10/44 (2006.01)
H01M 10/48 (2006.01)

(52) U.S. Cl.
CPC ........... *H02J 7/0068* (2013.01); *H01M 10/441* (2013.01); *H01M 10/482* (2013.01); *H02J 7/0021* (2013.01); *H02J 7/0063* (2013.01); *H02J 2007/0067* (2013.01); *Y02T 10/7055* (2013.01)

(58) Field of Classification Search
CPC .................. H02J 2007/0005; H02J 2007/0067
USPC ........................................................ 324/434
See application file for complete search history.

(56) References Cited

U.S. PATENT DOCUMENTS

| 5,666,006 | A | * | 9/1997 | Townsley et al. ................ 307/66 |
| 6,262,494 | B1 | * | 7/2001 | Tsukuni et al. .................. 307/80 |
| 2004/0257041 | A1 | * | 12/2004 | Nagaoka ......................... 320/128 |
| 2008/0169789 | A1 | * | 7/2008 | Yamabe ......................... 320/136 |
| 2009/0131215 | A1 | * | 5/2009 | Shamoto ............................ 477/3 |

FOREIGN PATENT DOCUMENTS

| CN | 101622769 A | 1/2010 |
| EP | 1328052 A2 | 7/2003 |

(Continued)

OTHER PUBLICATIONS

Communication dated Nov. 4, 2014, issued by the State Intellectual Property Office of the People's Republic of China in corresponding Chinese Application No. 201180062348.8.

(Continued)

*Primary Examiner* — Edward Tso
*Assistant Examiner* — Ahmed Omar
(74) *Attorney, Agent, or Firm* — Sughrue Mion, PLLC

(57) ABSTRACT

Remaining capacity calculation section (110) calculates the remaining capacity for each of cells (300-1) and (300-2) connected in parallel with each other, and control section (130) stops discharge of the first cell from cells (300-1) and (300-2), whose remaining capacity calculated by remaining capacity calculation section (110), has become equal to a threshold value stored in storage section (120) after the start of discharge of cells (300-1) and (300-2).

9 Claims, 9 Drawing Sheets

(56) References Cited

FOREIGN PATENT DOCUMENTS

| | | |
|---|---|---|
| EP | 2120310 A1 | 11/2009 |
| JP | 7-322517 A | 12/1995 |
| JP | 10123225 A | 5/1998 |
| JP | 11-273747 A | 10/1999 |
| JP | 2005168259 A | 6/2005 |
| JP | 2007-259612 A | 10/2007 |
| JP | 2008-226511 A | 9/2008 |
| JP | 2009-033936 A | 2/2009 |

OTHER PUBLICATIONS

Communication dated Jul. 30, 2014 from the European Patent Office in counterpart European Patent Application No. 11850012.3.

Communication dated Feb. 3, 2015, issued by the Japanese Patent Office in corresponding Application No. 2010287811.

Communication dated Sep. 16, 2014, issued by the Japanese Patent Office in corresponding Application No. 2010-287811.

* cited by examiner

DISCHARGE CONTROLLER

CROSS REFERENCE TO RELATED APPLICATIONS

This application is a National Stage of International Application No. PCT/JP2011/074757, filed on Oct. 27, 2011, claiming priority from Japanese Patent Application No. 2010-287811, filed Dec. 24, 2010, the contents of all of which are incorporated herein by reference in their entirety.

TECHNICAL FIELD

The present invention relates to a discharge controller, a discharge control method and a program for controlling discharge of cells.

BACKGROUND ART

In recent years, in various fields, there have been growing concerns about environmental problems.

With these concerns, in the field of electric power supply, certain approaches to power supply such as photovoltaic (PV) power generation and use of secondary cells used in electric vehicles (EVs) and hybrid EVs (HEVs) have attracted attention. Lithium-ion secondary cells are considered promising in such secondary cells. It is expected that lead storage cells will be replaced with Lithium-ion secondary cells in response to widespread use thereof in the future.

As a rule, connecting an old cell (having a small discharge capacity, a high degree of degradation) and a new cell (having a larger discharge capacity, a low degree of degradation) in parallel with each other should be avoided. This is for the purpose of avoiding a cross current caused by a difference between the voltages of the cells. A large cross current can cause excess current or abnormal heat generation. The same can be said with respect to the above-described secondary cells.

In order to adjust the degrees of degradation of a plurality of cells connected in parallel with each other, a system has therefore been devised in which respective switches for making connection/disconnection are provided for the plurality of cells, and a switch that is provided only for the cell that has a higher voltage than that of the other cells is connected (maintained in the on state) at the time of discharge until the differences between the voltages of the cells become equal to or smaller than a predetermined value (see, for example, Patent Literature 1).

CITATION LIST

Patent Literature

Patent Literature 1: JP2009-033936A

SUMMARY OF INVENTION

Technical Problem

With the above-described system, however, a problem is that it is necessary to calculate the differences between the voltages of the cells.

An object of the present invention is to provide a discharge controller, a discharge control method and a program as a solution to the above-described problem.

Solution to Problem

A discharge controller according to the present invention is a discharge controller for controlling discharge of a plurality of cells connected in parallel with each other, the controller including:

a remaining capacity calculation section that calculates a remaining capacity for each of the plurality of cells; and a control section that, after starting discharge of the plurality of cells, compares the remaining capacities calculated by the remaining capacity calculation section with a threshold value set in advance, and stops discharge of the first cell whose remaining capacity has become equal to the threshold value.

A discharge control method according to the present invention is a discharge control method of controlling discharge of a plurality of cells connected in parallel with each other, the method including the steps of:

discharging the plurality of cells;

calculating a remaining capacity for each of the plurality of cells;

comparing the calculated remaining capacities with a threshold value set in advance, after starting discharge of the plurality of cells; and stopping, as a result of the comparison, discharge of one of the cells whose remaining capacity is the first to become equal to the threshold value.

A program according to the present invention is a program for making a controller that controls discharge of a plurality of cells connected in parallel with each other execute a process that consists of the steps of:

discharging the plurality of cells;

calculating a remaining capacity for each of the plurality of cells;

comparing the calculated remaining capacities with a threshold value set in advance, after starting discharge of the plurality of cells; and stopping, as a result of the comparison, discharge the first cell whose remaining capacity has become equal to the threshold value.

Advantageous Effect of Invention

As described above, according to the present invention, the battery life of a system including a plurality of cells can be easily extended.

DESCRIPTION OF EMBODIMENT

In recent years, a "degradation region" in which degradation of a lithium-ion cell is promoted in an intermediate region of the lithium-ion cell (the region from the upper limit to the lower limit of the discharge capacity in which the cell can supply power) has been discovered. Such a degradation region is noticeably recognized in lithium-ion cells with manganese-based positive electrodes in particular. Data that has been collected indicates that passage through the degradation region promotes degradation of a cell when the cell is discharged and discharge capacity remaining in the cell is being reduced.

In the present invention, this degradation region is utilized when the degrees of degradation of a plurality of cells are adjusted to each other in order to extend the battery life of the system.

An exemplary embodiment will be described below with reference to the drawings.

Figure 1:
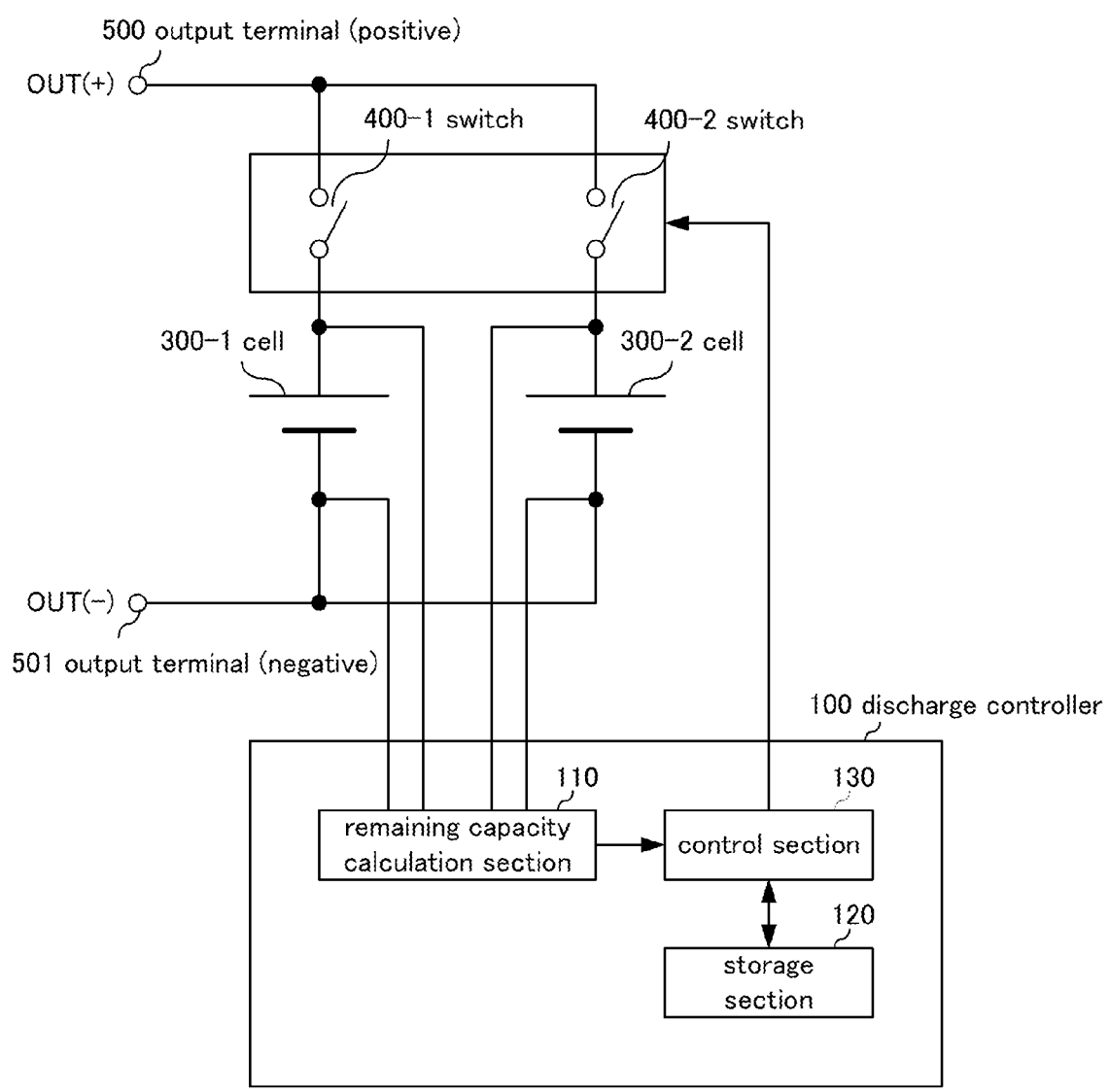
FIG. 1 is a diagram showing an exemplary embodiment of a discharge controller of the present invention.

FIG. 1 is a diagram showing an exemplary embodiment of a discharge controller of the present invention.

As shown in FIG. 1, the present exemplary embodiment includes discharge controller 100, cells 300-1 and 300-2, switches 400-1 and 400-2, output terminal (positive) 500 and output terminal (negative) 501.

Cells 300-1 and 300-2 are lithium-ion cells connected in parallel. Negative electrode sides of cells 300-1 and 300-2 are connected to output terminal (negative) 501. Positive electrode sides of cells 300-1 and 300-2 are connected to switches 400-1 and 400-2, respectively. The number of cells connected in parallel is not limited to two.

Switches 400-1 and 400-2 are switches to be closed/opened to establish or break connections between cells 300-1 and 300-2 and output terminal (positive) 500 for externally discharging from cells 300-1 and 300-2. This opening/closing is controlled by discharge controller 100. The number of switches is the same as the number of cells.

Discharge controller 100 controls discharge of cells 300-1 and 300-2 by controlling opening/closing of switches 400-1 and 400-2 based on remaining capacities of cells 300-1 and 300-2.

In discharge controller 100, remaining capacity calculation section 110, storage section 120 and control section 130 are provided, as shown in FIG. 1.

Remaining capacity calculation section 110 calculates remaining capacities of cells 300-1 and 300-2. Remaining capacity calculation section 110 also calculates as remaining capacities the values of voltages across cells 300-1 and 300-2. Strictly speaking, in the case of using the voltage value as a remaining capacity as described above, the present resistance value is calculated from the present current and voltage values, and a voltage value estimated based on them by an open voltage method is calculated as the remaining capacity.

Figure 2:
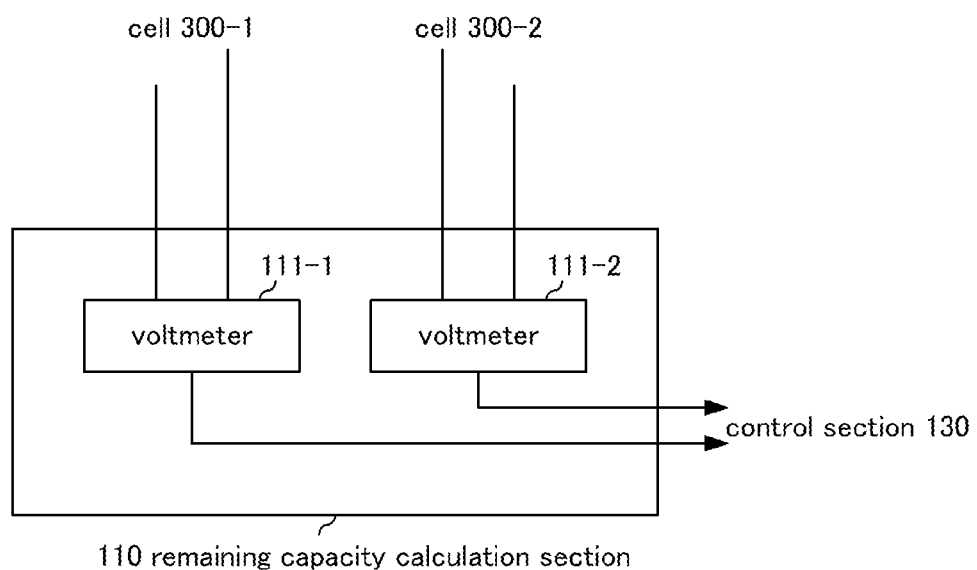
FIG. 2 is a diagram showing an example of an internal configuration of a remaining capacity calculation section shown in FIG. 1.

FIG. 2 is a diagram showing an example of an internal configuration of remaining capacity calculation section 110 shown in FIG. 1.

In remaining capacity calculation section 110 shown in FIG. 1, voltmeters 111-1 and 111-2 are provided, as shown in FIG. 2.

Voltmeter 111-1 measures the voltage across cell 300-1. Voltmeter 111-1 also outputs the measured value of voltage across cell 300-1 to control section 130.

Voltmeter 111-2 measures the voltage across cell 300-2. Voltmeter 111-2 also outputs the measured value of voltage across cell 300-2 to control section 130.

A method of calculating, when cells 300-1 and 300-2 shown in FIG. 1 are discharged, remaining cell capacities, with respect to time, based upon changes in the values of voltages across cells 300-1 and 300-2 respectively measured by voltmeters 111-1 and 111-2 will be described. Description will be made hereinbelow by way of example to a method of calculating a remaining cell capacity, with respect to time, based upon a change in the value of voltage across cell 300-1 measured by voltmeter 111-1 when cell 300-1 is discharged. A method of calculating a remaining cell capacity, with respect to time, based upon a change in the value of voltage across cell 300-2 measured by voltmeter 111-2 when cell 300-2 is discharged is the same as the method of calculation with respect to cell 300-1.

Figure 3:
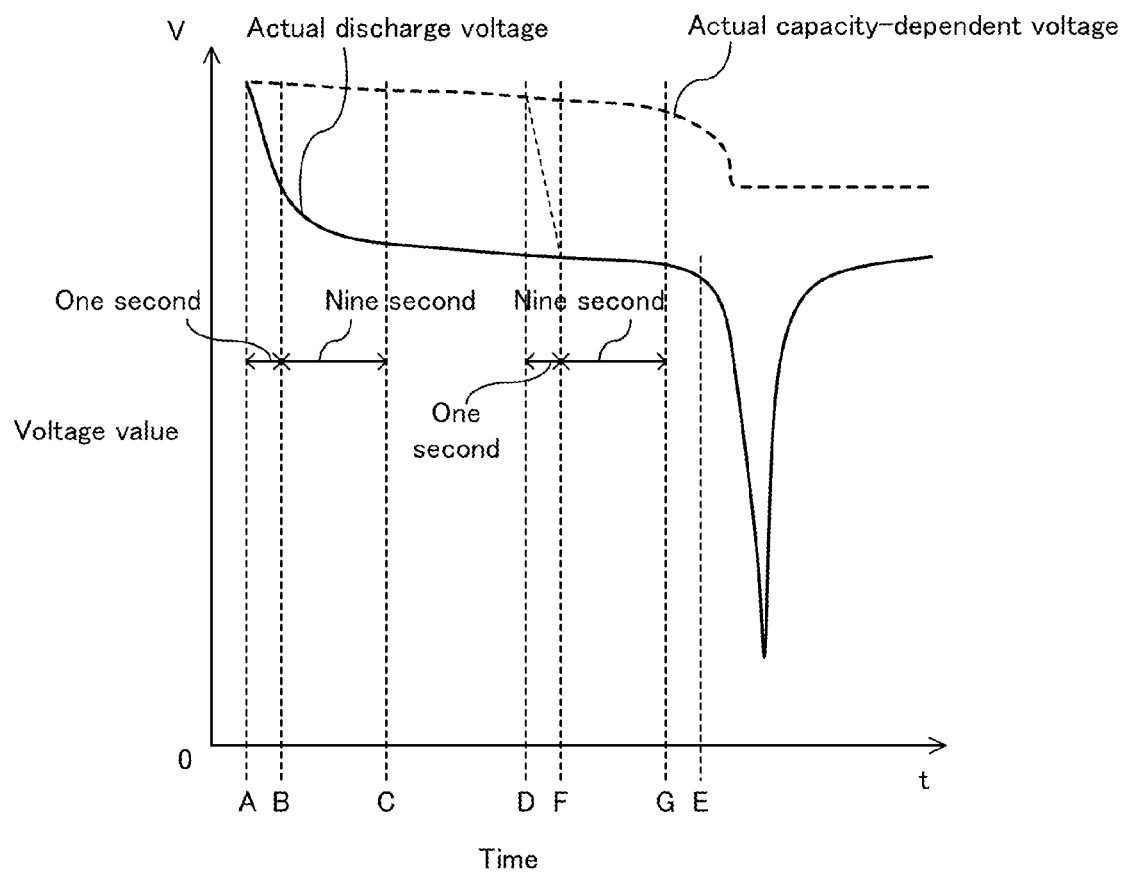
FIG. 3 is a diagram showing an example of changes with respect to time in the value of voltage across a cell shown in FIG. 1 measured by a voltmeter when the cell is discharged.

FIG. 3 is a diagram showing an example of changes with respect to time in the value of voltage across cell 300-1 measured by voltmeter 111-1 when cell 300-1 shown in FIG. 1 is discharged.

As shown in FIG. 3, the value of voltage across cell 300-1 measured by voltmeter 111-1 ("actual discharge voltage" indicated by the solid line in FIG. 3) is lower than the actual capacity-dependent voltage indicated by the broken line because an external impedance, which is an external cause that is separate from the internal impedance of cell 300-1, is added as a causal resistance value (impedance) to the internal impedance of cell 300-1.

Therefore, the voltage value is estimated (corrected) by using the above-mentioned open voltage method.

"A" shown in FIG. 3 denotes a time at which discharge starts (point A), and "E" shown in FIG. 3 denotes a time at which discharge ends (point E). Point B is a point one second after point A, and point C is a point nine seconds after point B.

A one-second average impedance between point A and point B is first calculated. Since the time period from point A to point B is one second, the impedance calculated at one point (point A) is the one-second average impedance between point A and point B. The calculated impedance is expressed as "a Ω". This impedance "a Ω" is the sum of the internal impedance of the above-described cell 300-1 and the other external impedance.

A one-second-average impedance between point B and point C is thereafter calculated. Since the time period from point B to point C is nine seconds, impedance calculation is performed nine times at intervals of one second to obtain a one-second average value. The calculated impedance is expressed as "b Ω". This impedance "b Ω" is the internal impedance of the above-described cell 300-1.

Therefore, c Ω, which is the external impedance, can be calculated by subtracting b Ω from a Ω (a−b=c).

Thereafter, with approach to discharge end point E, a one-second-average impedance for one second (between point D and point F) and a one-second-average impedance for nine seconds (between point F and point G) are also calculated.

At point E, impedance is calculated from the value of voltage across cell 300-1 measured by voltmeter 111-1. A voltage at point F can be obtained by adding a voltage drop corresponding to b Ω from the calculated impedance at point E.

Subsequently, the actual capacity-dependent voltage (remaining capacity) can be calculated by adding the external impedance c Ω to the average value of the one-second-average impedance between point D and point F (1D Ω) and the one-second-average impedance between point F and point G (9D Ω), and by multiplying the value obtained by this addition by the current value (I). That is, if the remaining capacity is CAPV, the following equation holds:

$$CAPV=((1D+9D)/2+c)\times I.$$

If the value of the external impedance c Ω is set in advance, it also may be used. Remaining capacity calculation section 110 may calculate remaining capacities of cells 300-1 and 300-2 in this way.

A different method of calculating the remaining capacity of a cell is also conceivable. The above-described method is not exclusively used. For example, remaining capacity calculation section 110 may measure currents flowing from cells 300-1 and 300-2 and the respective time from a start of discharge from cells 300-1 and 300-2 and calculate remaining capacities by subtracting the measured currents multiplied by the respective time from the full-charge capacities of cells 300-1 and 300-2.

Storage section 120 stores a threshold value set in advance.

The threshold value stored in storage section 120 is a value larger by a predetermined value than the value at the upper side (upper limit) of the above-described "degradation region". That is, this threshold value is stored as a value on the verge of the "degradation region".

Figure 4:
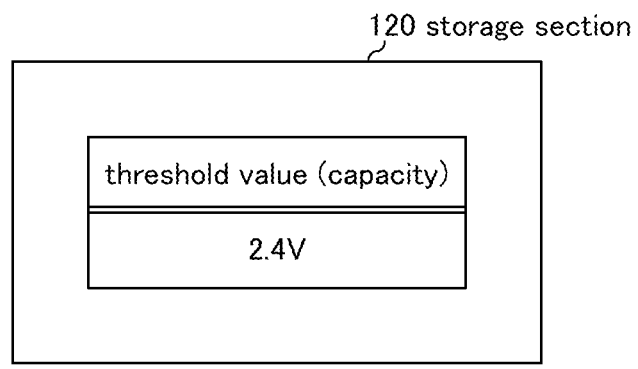
FIG. 4 is a diagram showing an example of a threshold value stored in a storage section shown in FIG. 1.

FIG. 4 is a diagram showing an example of the threshold value stored in storage section 120 shown in FIG. 1.

As shown in FIG. 4, the threshold value is stored in storage section 120 shown in FIG. 1.

For example, 2.4 V is stored as the threshold value (capacity), as shown in FIG. 4. This indicates that when the voltage value of the cell, or the remaining capacity of the cell, reaches 2.4 V, it also reaches a value on the verge of the degradation region.

Control section 130 reads out the threshold value stored in storage section 120 after starting discharge of cells 300-1 and 300-2, and compares the read threshold value with the voltage values output from voltmeters 111-1 and 111-2 as remaining capacities of cells 300-1 and 300-2. Control section 130 stops discharge of the first cell from cells 300-1 and 300-2 whose voltage value becomes equal to the threshold value. At this time, control section 130 continues discharge of the other of cells 300-1 and 300-2 whose voltage value has not become equal to the threshold value.

For example, when the voltage value of cell 300-1 first becomes equal to the threshold value after control section 130 has started discharge by closing switches 400-1 and 400-2, control section 130 sets switch 400-1 in the open state while maintaining switch 400-2 in the closed state.

When the voltage value of cell 300-2 first becomes equal to the threshold value after control section 130 has started discharge by closing switches 400-1 and 400-2, control section 130 sets switch 400-2 in the open state while maintaining switch 400-1 in the closed state.

Control section 130 may operate cells 300-1 and 300-2 in an ordinary two-cell parallel operation manner or may perform rotation discharge of cells 300-1 and 300-2 in a state where discharge of each cell is being continued. Specifically, in such a case, control section 130 may alternately perform opening/closing of switches 400-1 and 400-2. In a case where discharge of one of the cells has been stopped, control section 130 may operate in an ordinary parallel operation manner the cells other than the one not being discharged or may perform rotation discharge of the cells other than the one not being discharged.

Thus, control section 130 controls discharge and non-discharge of cells 300-1 and 300-2 by opening/closing switches 400-1 and 400-2.

A discharge control method in the exemplary embodiment shown in FIG. 1 will be described below.

Figure 5:
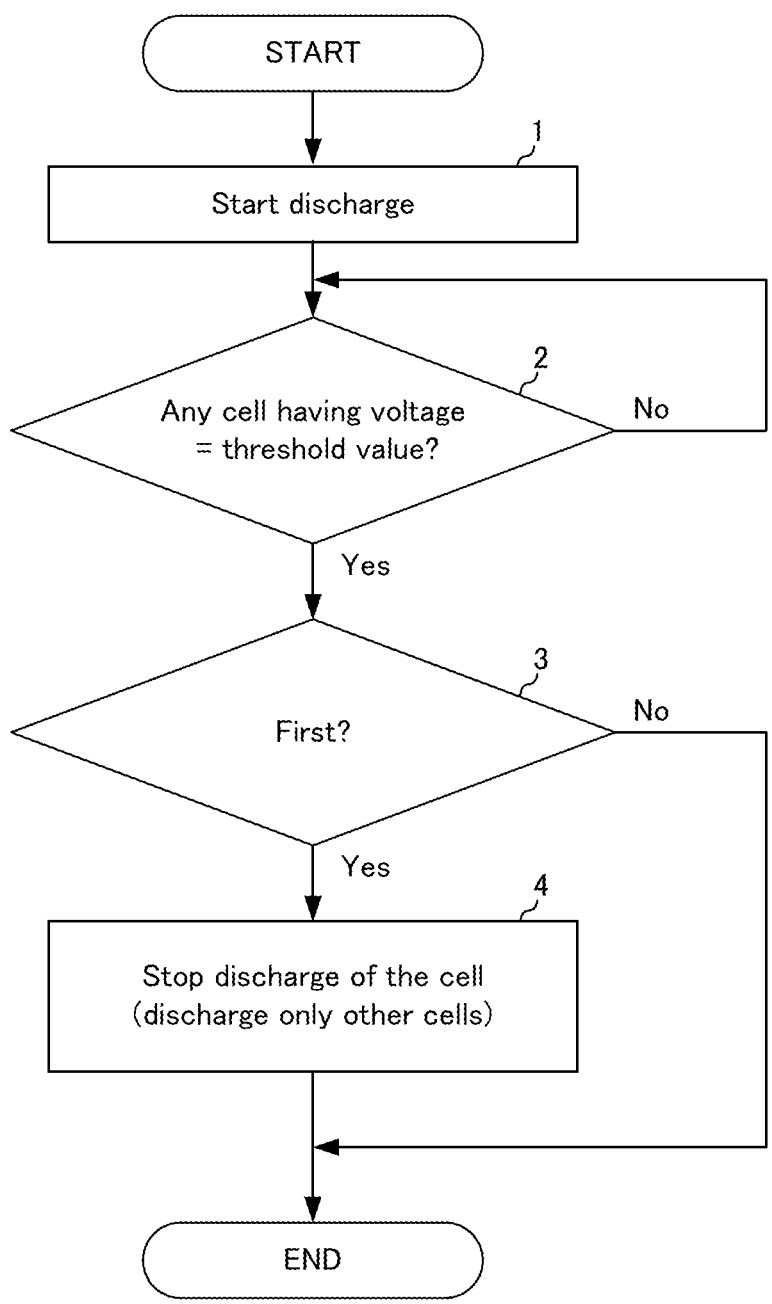
FIG. 5 is a flowchart for explaining a discharge control method in the exemplary embodiment shown in FIG. 1.

FIG. 5 is a flowchart showing a discharge control method in the exemplary embodiment shown in FIG. 1.

First, in step 1, the two-cell operation (discharge) of cells 300-1 and 300-2 is started.

When discharge is started, measurement of the respective values of voltages across cells 300-1 and 300-2 by voltmeters 111-1 and 111-2 is started.

Thereafter, in step 2, control section 130 determines whether or not the voltage value of one of the cells measured by voltmeter 111-1 or 111-2 is equal to the threshold value stored in storage section 120.

This determination is made based on the result of comparison between the voltage value measured by voltmeter 111-1 or 111-2 and the threshold value stored in storage section 120. This voltage value may be a value calculated by using the above-described open voltage method.

For example, in a case where a threshold value (2.4 V) such as shown in FIG. 4 is stored in storage section 120, if the voltage value measured by voltmeter 111-1 is 2.4 V while the voltage value measured by voltmeter 111-2 is 2.5 V, control section 130 determines that the voltage value of cell 300-1 measured by voltmeter 111-1 is equal to the threshold value.

If control section 130 does not determine in step 2 that the voltage value of one of the cells is equal to the threshold value, that is, each of the remaining capacities of cells 300-1 and 300-2 is larger than the threshold value, discharge of cells 300-1 and 300-2 is continued.

On the other hand, if control section 130 determines in step 2 that the voltage value of one of the cells is equal to the threshold value, it determines in step 3 whether or not that determination is the first one after the start of discharge. This determination as to whether or not that determination is the first one may be made by holding information indicating whether or not that determination was made after the start of discharge, and by referring to the information.

If that determination is the first one after the start of discharge, control section 130 stops, in step 4, discharge of the cell whose voltage value was determined to be equal to the threshold value in step 2, and discharge of only the other cell is performed. Control section 130 performs this discharge control by using opening/closing of switches 400-1 and 400-2, as described above.

If the result of determination in step 3 is that the determination is not the first one after the start of discharge, the process ends. That is, discharge of the cell presently being discharged is continued.

In the above-described example (the case where cell 300-1 is the cell whose voltage value became equal to the threshold value), control section 130 sets switch 400-1 in the open state. As a result, cell 300-1 that is connected to switch 400-1 is not discharged thereafter. On the other hand, control section 130 maintains switch 400-2 in the closed (connected) state. Discharge of cell 300-2 that is connected to switch 400-2 is continued thereby.

The voltage value of cell 300-2 measured by voltmeter 111-2 thereafter becomes equal to the threshold value stored in storage section 120. In this case, since this event is not "the first" after the start of discharge, discharge of cell 300-2 is not stopped.

A flag may be used for determination as to whether or not the event is "the first".

Figure 6:
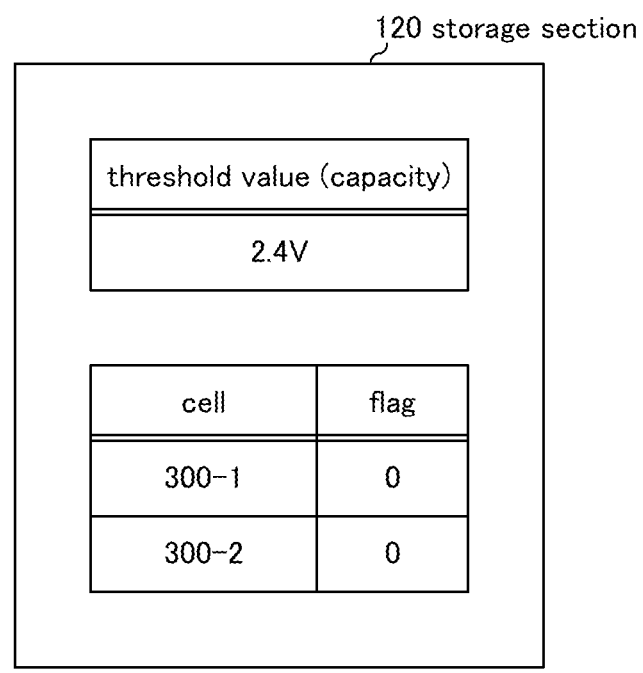
FIG. 6 is a diagram showing an example of flags stored in the storage section shown in FIG. 1.

FIG. 6 is a diagram showing an example of flags stored in storage section 120 shown in FIG. 1.

In storage section 120 shown in FIG. 1, the above-described threshold value and flags corresponding to cells 300-1 and 300-2 are stored, as shown in FIG. 6. Each flag indicates whether or not discharge has been stopped. For example, the flag may indicate that discharge is not stopped (discharge is being continued) when it is "0", and may indicate that discharge has been stopped (discharge is not being performed) when it is "1".

When the flag corresponding to cell 300-1 is "0", it indicates that discharge of cell 300-1 is not stopped (discharge is being continued), as shown in FIG. 6. Also, when the flag corresponding to cell 300-2 is "0", it indicates that discharge of cell 300-2 is not stopped (discharge is being continued).

A discharge control method using flags such as shown in FIG. 6 in the exemplary embodiment shown in FIG. 1 will be described below.

Figure 7:
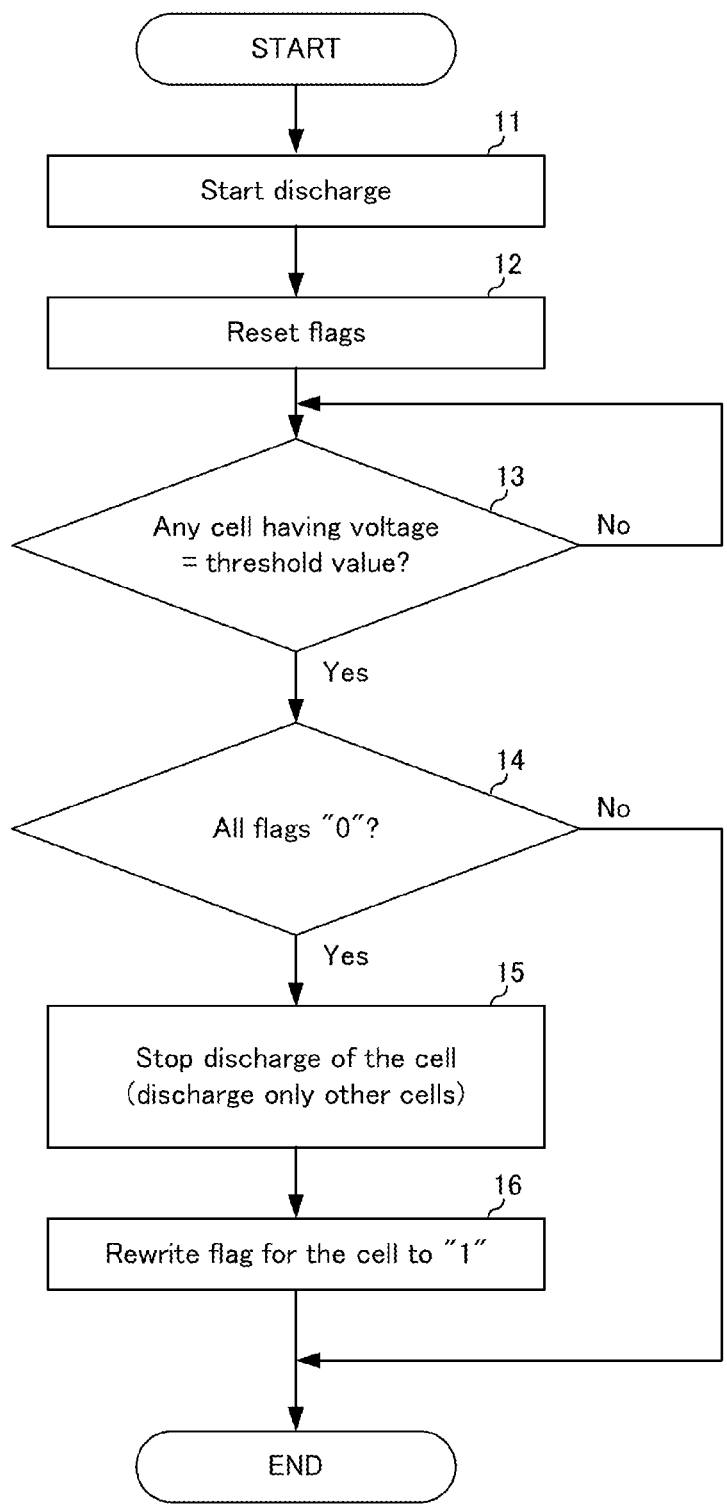
FIG. 7 is a flowchart for explaining an example of a discharge control method using flags such as shown in FIG. 6 in the exemplary embodiment shown in FIG. 1.

FIG. 7 is a flowchart for explaining an example of a discharge control method using flags such as shown in FIG. 6 in the exemplary embodiment shown in FIG. 1.

First, in step 11, the two-cell operation (discharge) of cells 300-1 and 300-2 is started.

Simultaneously, in step 12, control section 130 resets all the flags stored in storage section 120. In this resetting, control section 130 rewrites the flags to "0". That is, the flags are rewritten so as to indicate that "discharge is not stopped (discharge is being continued)".

When discharge is started, measurement of the respective values of voltages across cells 300-1 and 300-2 by voltmeters 111-1 and 111-2 is started.

Thereafter, control section 130 determines in step 13 whether or not the voltage value of one of the cells measured by voltmeter 111-1 or 111-2 is equal to the threshold value stored in storage section 120.

This determination is made based on the result of comparison between the voltage value measured by voltmeter 111-1 or 111-2 and the threshold value stored in storage section 120. This voltage value may be a value calculated by using the above-described open voltage method.

For example, in a case where a threshold value (2.4 V) such as shown in FIG. 4 is stored in storage section 120, if the voltage value measured by voltmeter 111-1 is 2.4 V while the voltage value measured by voltmeter 111-2 is 2.5 V, control section 130 determines that the voltage value of cell 300-1 measured by voltmeter 111-1 is equal to the threshold value.

If control section 130 does not determine in step 13 that the voltage value of one of the cells is equal to the threshold value, that is, each of the remaining capacities of cells 300-1 and 300-2 is larger than the threshold value, discharge of cells 300-1 and 300-2 is continued.

On the other hand, if control section 130 determines in step 13 that the voltage value of one of the cells is equal to the threshold value, it determines in step 14 whether or not all the flags stored in storage section 120 are "0".

If all the flags stored in storage section 120 are "0", control section 130 stops, in step 15, discharge of the cell determined to have the voltage value equal to the threshold value in step 13, and discharge of only the other cell is performed. Control section 130 performs this discharge control by using opening/closing of switches 400-1 and 400-2, as described above.

In step 16, control section 130 rewrites from "0" to "1" the flag associated in storage section 120 with the cell the discharge of which has been stopped.

On the other hand, in step 14, if not all the flags stored in storage section 120 are "0", the process ends. That is, discharge of the cell presently being discharged is continued.

In the above-described example, (the case where cell 300-1 is the cell whose voltage value became equal to the threshold value), control section 130 sets switch 400-1 in the open state. As a result, cell 300-1 that is connected to switch 400-1 is not discharged thereafter. On the other hand, control section 130 maintains switch 400-2 in the closed (connected) state. Discharge of cell 300-2 that is connected to switch 400-2 is continued thereby.

The voltage value of cell 300-2 measured by voltmeter 111-2 thereafter becomes equal to the threshold value stored in storage section 120. Since not all the flags stored in storage section 120 are "0" at this time, discharge of cell 300-2 is not stopped.

The order of the above-described processings in step 13 and step 14 may be reversed.

Figure 8:
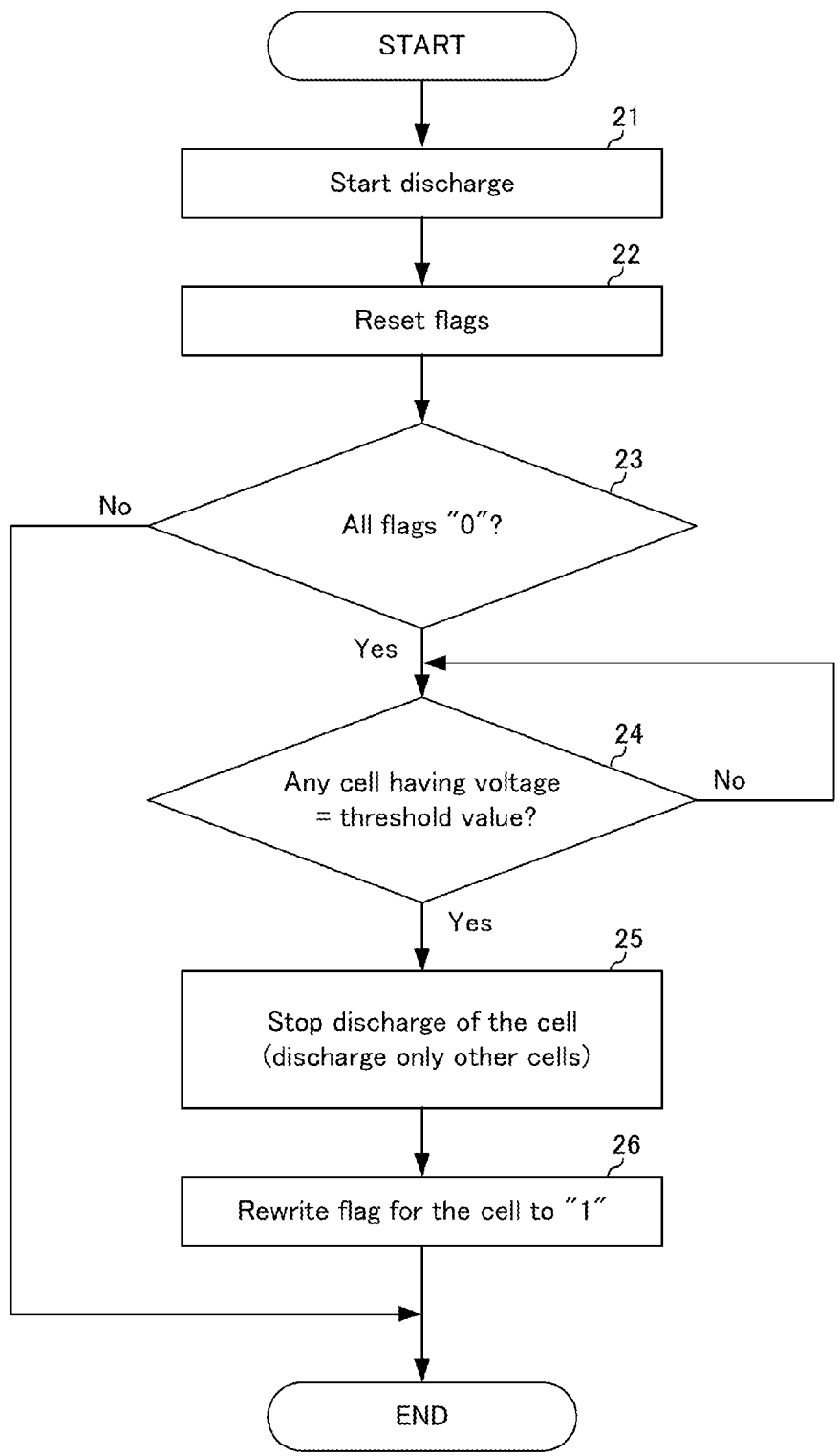
FIG. 8 is a flowchart for explaining another example of the discharge control method using flags such as shown in FIG. 6 in the exemplary embodiment shown in FIG. 1.

FIG. 8 is a flowchart for explaining another example of the discharge control method using flags such as shown in FIG. 6 in the exemplary embodiment shown in FIG. 1.

First, in step 21, the two-cell operation (discharge) of cells 300-1 and 300-2 is started.

Simultaneously, in step 22, control section 130 resets all the flags stored in storage section 120. In this resetting, control section 130 rewrites the flags to "0". That is, the flags are rewritten so as to indicate that "discharge is not stopped (discharge is being continued)".

When discharge is started, measurement of the values of voltages across cells 300-1 and 300-2 by voltmeters 111-1 and 111-2 is started.

Thereafter, control section 130 determines in step 23 whether or not all the flags stored in storage section 120 are "0".

If all the flags stored in storage section 120 are "0", control section 130 determines in step 24 whether or not the voltage value of one of the cells measured by voltmeter 111-1 or 111-2 is equal to the threshold value stored in storage section 120.

If control section 130 does not determine in step 24 that the voltage value of one of the cells is equal to the threshold value, that is, each of the remaining capacities of cells 300-1 and 300-2 is larger than the threshold value, discharge of cells 300-1 and 300-2 is continued.

On the other hand, if control section 130 determines in step 24 that the voltage value of one of the cells is equal to the threshold value, it stops discharge of the cell in step 25, and discharge of only the other cell is performed. Control section 130 performs this discharge control by using opening/closing of switches 400-1 and 400-2, as described above.

In step 26, control section 130 rewrites from "0" to "1" the flag associated in storage section 120 with the cell the discharge of which has been stopped.

On the other hand, in step 23, if not all the flags stored in storage section 120 are "0", the process ends. That is, discharge of the cell presently being discharged is continued.

In the above-described example, (the case where cell 300-1 is the cell whose voltage value became equal to the threshold value), control section 130 sets switch 400-1 in the open state. As a result, cell 300-1 connected to switch 400-1 is not discharged thereafter. On the other hand, control section 130 maintains switch 400-2 in the closed (connected) state. Discharge of cell 300-2 connected to switch 400-2 is continued thereby.

The voltage value of cell 300-2 measured by voltmeter 111-2 thereafter becomes equal to the threshold value stored in storage section 120. Since not all the flags stored in storage section 120 are "0" at this time, discharge of cell 300-2 is not stopped.

Figure 9:
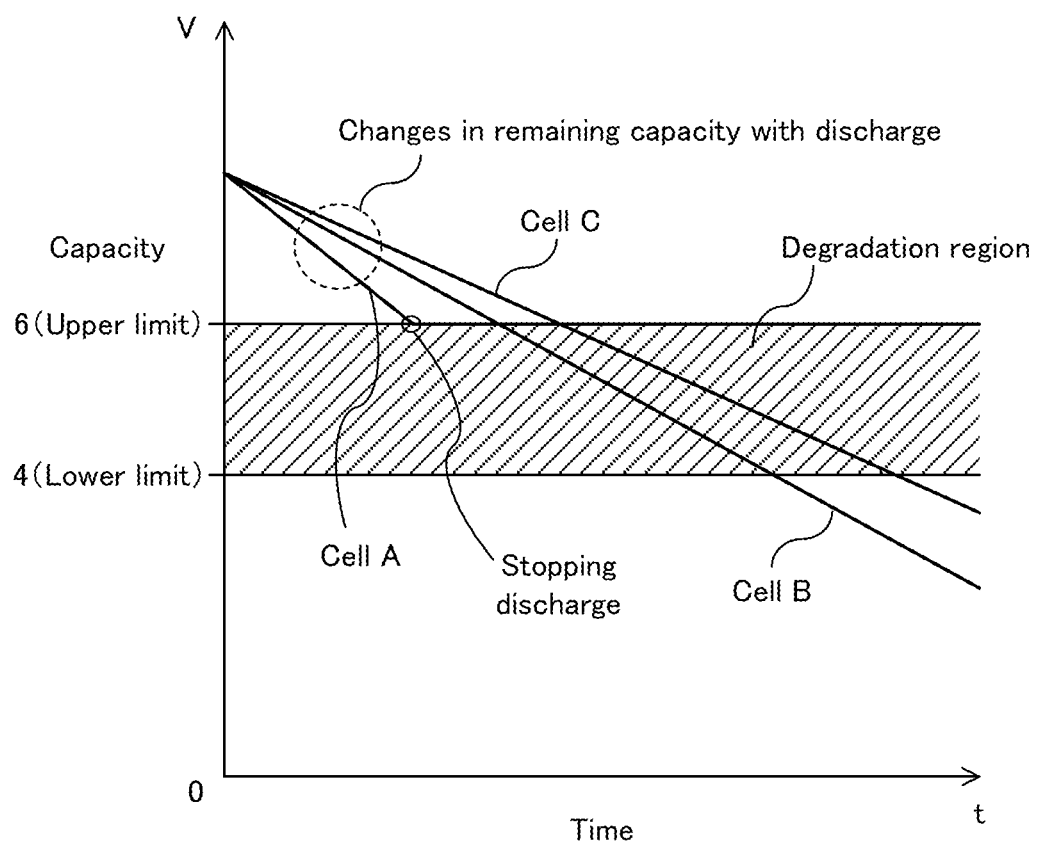
FIG. 9 is a graph showing an example of changes in the remaining capacity of cells with respect to time as the cell is discharged according to the present invention.

FIG. 9 is a graph showing an example of changes in remaining capacity of cells with respect to time as the cell is discharged according to the present invention. A case where three cells A, B, and C are operated in parallel will be described below by way of example. Also, a case where the decreasing order of the degrees of degradation of the cells is the order of cell A, cell B and cell C will be described by way of example.

As shown in FIG. 9, after a start of discharge of cells A, B, and C, the operation of cell A having the highest degree of degradation first reaches the upper limit of the degradation region. Therefore, discharge of cell A is stopped.

Thereafter, the operations of cells B and C having degrees of degradation lower than that of cell A also reach the degradation region. However, these are not "the first" and, therefore, the same states of discharge of cells B and C are maintained.

As described above, discharge of one of a plurality of cells first having a remaining capacity value on the verge of the degradation region after a start of discharge of the cells is stopped, while discharge of the other cells is continued, thus enabling reducing the degradation of the cell having the highest degree of degradation while promoting the degradation of the other cells. In this way, the degrees of degradation of the cells can be made even. As a result, the battery life of the system can be easily extended. This effect is particularly high when discharge control is performed on lithium-ion cells with manganese-based positive poles in which the degradation region is noticeably recognized.

Easily understandable numeric values including capacities have been used in the above text or the drawings for ease of description. Not all of them are the same as the actual values.

Processing operations performed by the components provided in the above-described discharge controller 100 may be performed by logic circuits made according to the respective purposes. Also, a program in which details of the processing operations are described as process steps may be recorded on a recording medium readable in discharge controller 100, and the program recorded on this recording medium may be read by discharge controller 100 to be executed. "Recording medium readable in discharge controller 100" denotes a removable recording medium such as a floppy (trademark) disk, a magneto-optical disk, a DVD or a CD, or a memory such as a ROM or a RAM, an HDD or the like incorporated in discharge controller 100. The program recorded on this recording medium is read by a CPU (not shown in the drawings) provided in discharge controller 100 and processing operations similar to those described above are performed under the control of the CPU. The CPU operates as a computer to execute the program read from the recording medium on which the program is recorded.

The invention of the present application has been described by referring to the exemplary embodiment. However, the invention of the present application is not limited to the above-described exemplary embodiment. Various changes and modifications understandable by those skilled in the art can be made to the configuration and details of the invention of the present application within the scope of the invention of the present application.

This application is based upon and claims the benefit of priority from prior Japanese Application No. 2010-287811 filed on Dec. 24, 2010, the entire contents of which are incorporated herein by reference.

The invention claimed is:

1. A discharge controller for controlling discharge of a plurality of cells connected in parallel with each other, the controller comprising:

a remaining capacity calculation section that calculates a remaining capacity for each of the plurality of cells; and a control section that, after starting discharge of the plurality of cells, compares the remaining capacities calculated by said remaining capacity calculation section with a threshold value set in advance, and stops discharge of the first cell whose remaining capacity has become equal to the threshold value, and continues discharge of the other cells whose remaining capacity has become equal to the threshold value.

2. The discharge controller according to claim 1, wherein said remaining capacity calculation section measures the voltages of the cells and uses the measured voltages as the remaining capacities.

3. The discharge controller according to claim 1, further comprising a storage section that stores the threshold value in advance, wherein said control section reads out the threshold value stored in said storage section and makes comparison between the threshold value and the remaining capacities.

4. The discharge controller according to claim 1, wherein said control section controls discharge and non-discharge of the plurality of cells by opening/closing a plurality of switches for establishing or breaking connection between each of the plurality of cells and an output terminal through which cells are externally discharged.

5. The discharge controller according to claim 1, wherein said control section performs sequential discharging of the cells other than the cell which is in a rest state after being discharged, the rest state is a state in which the discharge has been stopped.

6. The discharge controller according to claim 3, wherein said storage section stores flags respectively for the plurality of the cells, each flag indicating whether or not the cell is not being discharged, and wherein said control section rewrites, at the start of discharge, all the flags so as to indicate that the cell is being discharged, makes comparison when each of the flags indicates that the cell is being discharged, and, when stopping discharge of the first cell whose remaining capacity has become equal to the threshold value, rewrites the flag corresponding to the one of the cells so as to indicate that the cell is not being discharged.

7. A discharge control method of controlling discharge of a plurality of cells connected in parallel with each other, the method comprising:

discharging the plurality of cells;

calculating a remaining capacity for each of the plurality of cells;

comparing the calculated remaining capacities with a threshold value set in advance, after starting discharge of the plurality of cells;

stopping, as a result of the comparison, discharge of the first cell whose remaining capacity has become equal to the threshold value; and continuing, as a result of the comparison, discharge of the other cells whose remaining capacity has become equal to the threshold value.

8. The discharge control method according to claim 7, wherein said calculating includes measuring the voltages of the cells and using the measured voltages as the remaining capacities.

9. The discharge control method according to claim 7, further comprising performing sequential discharging of the cells other than the cell which is in a rest state after being discharged, the rest state is a state in which the discharge has been stopped.

\* \* \* \* \*